United States Patent
Rowker et al.

(10) Patent No.: US 8,855,880 B2
(45) Date of Patent: Oct. 7, 2014

(54) METHOD AND SYSTEM FOR DISPLAYING BRAKING INFORMATION

(75) Inventors: James D. Rowker, San Pedro, CA (US); Avernethy Francisco, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 862 days.

(21) Appl. No.: 12/573,641

(22) Filed: Oct. 5, 2009

(65) Prior Publication Data
US 2011/0082632 A1 Apr. 7, 2011

(51) Int. Cl.
| B60T 8/1755 | (2006.01) |
| B60W 10/188 | (2012.01) |
| B60W 30/18 | (2012.01) |
| B60K 35/00 | (2006.01) |
| B60W 50/14 | (2012.01) |
| B60W 10/08 | (2006.01) |
| B60K 6/20 | (2007.10) |

(52) U.S. Cl.
CPC .......... B60K 35/00 (2013.01); B60W 2710/083 (2013.01); B60K 2350/1092 (2013.01); B60W 10/188 (2013.01); B60W 30/18127 (2013.01); B60K 6/20 (2013.01); B60W 2540/12 (2013.01); B60W 50/14 (2013.01); B60W 10/08 (2013.01)
USPC .................. 701/70; 701/22; 701/71; 340/438; 340/461; 180/65.1; 180/65.23; 180/65.24; 180/165

(58) Field of Classification Search
CPC ......... B60T 8/1755; B60T 8/172; B60T 7/22; B60W 10/184; B60W 10/18
USPC ........ 701/70, 22, 71; 340/453, 461, 438, 139; 116/28 R; 703/8, 21
See application file for complete search history.

(56) References Cited

U.S. PATENT DOCUMENTS

| 4,351,405 A | 9/1982 | Fields et al. |
| 5,693,876 A | 12/1997 | Ghitea et al. |
| 5,698,983 A | 12/1997 | Arai et al. |
| 5,771,475 A | 6/1998 | Tabata et al. |
| 5,939,861 A | 8/1999 | Joko et al. |

(Continued)

FOREIGN PATENT DOCUMENTS

| EP | 1872999 | 1/2008 |
| JP | 7315078 | 12/1995 |

(Continued)

*Primary Examiner* — Helal A Algahaim
*Assistant Examiner* — Jelani Smith
(74) *Attorney, Agent, or Firm* — Snell & Wilmer LLP (57) ABSTRACT

The present invention relates to a method and system for displaying braking information such as energy dissipation braking information and regenerative braking information. The present invention can be an automobile including an energy dissipation braking system, a regenerative braking system, an energy dissipation braking sensor, a regenerative braking sensor, an energy conversions system, an energy storage unit, an energy storage sensor, a processor, an engine, and/or a display. The processor, energy dissipation braking sensor, and/or the regenerative braking system can acquire and analyze energy dissipating braking data and regenerative braking data in an automobile to determine appropriate braking information for display to a user on the display. Such braking information can include, for example, an energy efficiency rate, and/or an application percentage of the energy dissipation braking system and/or the regenerative braking system. The braking information can also be displayed in various modes to indicate desirable braking applications.

16 Claims, 10 Drawing Sheets

(56) References Cited

U.S. PATENT DOCUMENTS

| | | | |
|---|---|---|---|
| 6,232,729 B1 | 5/2001 | Inoue | |
| 6,309,031 B1 | 10/2001 | Crombez et al. | |
| 6,349,997 B1 | 2/2002 | Unterforsthuber et al. | |
| 6,367,570 B1 | 4/2002 | Long et al. | |
| 6,480,106 B1 | 11/2002 | Crombez et al. | |
| 6,581,707 B2 | 6/2003 | Morimoto et al. | |
| 6,794,853 B2 | 9/2004 | Kondo | |
| 7,019,632 B2 | 3/2006 | Cole | |
| 7,047,120 B2 | 5/2006 | Perach et al. | |
| 7,437,231 B2 | 10/2008 | Kolberg | |
| 7,474,309 B2 | 1/2009 | Kolpasky et al. | |
| 7,603,228 B2 | 10/2009 | Coughlin | |
| 7,798,578 B2 | 9/2010 | Lewis et al. | |
| 8,120,478 B2* | 2/2012 | Skaff et al. | 340/438 |
| 2002/0171541 A1 | 11/2002 | Crombez et al. | |
| 2005/0234627 A1 | 10/2005 | Parach et al. | |
| 2006/0102394 A1* | 5/2006 | Oliver | 180/65.2 |
| 2007/0029874 A1* | 2/2007 | Finch et al. | 303/152 |
| 2007/0176762 A1 | 8/2007 | Aoyagi et al. | |
| 2007/0295544 A1 | 12/2007 | Borroni-Bird et al. | |
| 2007/0296567 A1 | 12/2007 | Tamai et al. | |
| 2008/0042489 A1 | 2/2008 | Lewis et al. | |
| 2008/0042821 A1 | 2/2008 | Kaya | |
| 2008/0158510 A1 | 7/2008 | Tant et al. | |
| 2009/0040033 A1 | 2/2009 | Uchida | |
| 2009/0234528 A1 | 9/2009 | Crombez | |
| 2010/0030413 A1 | 2/2010 | Jinno | |
| 2010/0106353 A1* | 4/2010 | Watson et al. | 701/22 |
| 2010/0301668 A1* | 12/2010 | Yakes et al. | 307/9.1 |
| 2010/0313849 A1* | 12/2010 | Stoner et al. | 123/350 |
| 2011/0023772 A1* | 2/2011 | Crombez | 116/28 R |

FOREIGN PATENT DOCUMENTS

| | | |
|---|---|---|
| JP | 9098501 | 4/1997 |
| JP | 9107601 | 4/1997 |
| JP | 9168202 | 6/1997 |
| JP | 2005297962 | 10/2005 |

* cited by examiner

METHOD AND SYSTEM FOR DISPLAYING BRAKING INFORMATION

BACKGROUND

1. Field

The present invention relates to a method and system for displaying braking information, and more particularly to a method and system for displaying energy dissipation braking information and regenerative braking information.

2. Description of the Related Art

With global energy prices rapidly increasing, consumers and automotive manufacturers are seeking new and novel ways to reduce energy consumption costs. For example, the hybrid automobile was created as a way to increase the efficiency of the automobile. The hybrid automobile uses both an engine and a motor to accelerate the automobile. To stop the hybrid automobile, the hybrid automobile uses both energy dissipation brakes and regenerative brakes. The regenerative brakes allow the motor to generate energy instead of deplete energy. This allows for a partial recapture of energy expended by the motor in moving the hybrid automobile. One drawback of regenerative brakes, are that they are unable in certain circumstances to slow the hybrid automobile down at a sufficient rate, especially when an extremely short stopping distance is required. In such a case, energy dissipation brakes are used solely, or in conjunction with the regenerative brakes, to slow the hybrid automobile down. Energy dissipation brakes, however, generally do not recapture energy or do not recapture energy with nearly as much efficiency as the regenerative brakes. Unfortunately, drivers do not always maximize the use of regenerative brakes and instead may be prone to underutilizing the regenerative brakes and over utilizing the energy dissipation brakes. This leads to reduced energy efficiency of the automobile, such as the hybrid automobile. Furthermore, the drivers may not be aware of the inefficient use of the automobile during braking as conventional automobiles do not provide such information.

Thus, there is a need for a method and system for displaying braking information, and more particularly a method and system for displaying energy dissipation braking information and regenerative braking information, which can promote a more efficient use of the automobile.

SUMMARY

The present invention is a method and system for displaying braking information, and more specifically for displaying energy dissipation braking information and regenerative braking information, which can promote a more efficient use of the automobile. The present invention can be, for example, an automobile including an energy dissipation braking system, a regenerative braking system, an energy dissipation braking sensor, a regenerative braking sensor, an energy conversions system, an energy storage unit, an energy storage sensor, a processor, an engine, and/or a display. The processor, energy dissipation braking sensor, and/or the regenerative braking system can acquire and analyze energy dissipating braking data and regenerative braking data in an automobile to determine appropriate braking information for display to a user on the display.

Such braking information can include, for example, an energy efficiency rate, and/or an application percentage of the energy dissipation braking system and/or the regenerative braking system. The braking information can also be displayed in various modes to indicate desirable braking applications. The display of the braking information can thus provide information which can improve the user's driving habits to allow him to brake more efficiently. This can reduce energy consumption of the automobile and also improve the efficiency of the automobile.

In one embodiment, the present invention is a system for displaying braking information including an energy dissipation braking sensor generating energy dissipation brake data, a regenerative braking sensor generating regenerative brake data, a processor receiving the energy dissipation brake data and the regenerative brake data, and analyzing the energy dissipation brake data and the regenerative brake data, and a display communicatively coupled to the processor, the display displaying an image in a first display mode or a second display mode based on the regenerative brake data and the energy dissipation brake data.

In another embodiment, the present invention is an automobile including a hydraulic brake, a hydraulic braking sensor generating hydraulic brake data from the hydraulic brake, a regenerative brake, a regenerative braking sensor generating regenerative brake data from the regenerative brake, a processor receiving the regenerative brake data and the hydraulic brake data, and determining an application percentage of the hydraulic brake based on the hydraulic brake data and an application percentage of the regenerative brake based on the regenerative brake data, and a display communicatively coupled to the processor, the display displaying an image in a first display mode in a first color or a second display mode in a second color different from the first color based on the application percentage of the hydraulic brake, and the application percentage of the regenerative brake.

In yet another embodiment, the present invention is a method for displaying braking information for hydraulic brakes and regenerative brakes including generating hydraulic brake data corresponding to the hydraulic brakes, generating regenerative brake data corresponding to the regenerative brakes, analyzing the hydraulic brake data and the regenerative brake data, and displaying an image in a first display mode or a second display mode based on the regenerative brake data and the hydraulic brake data.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
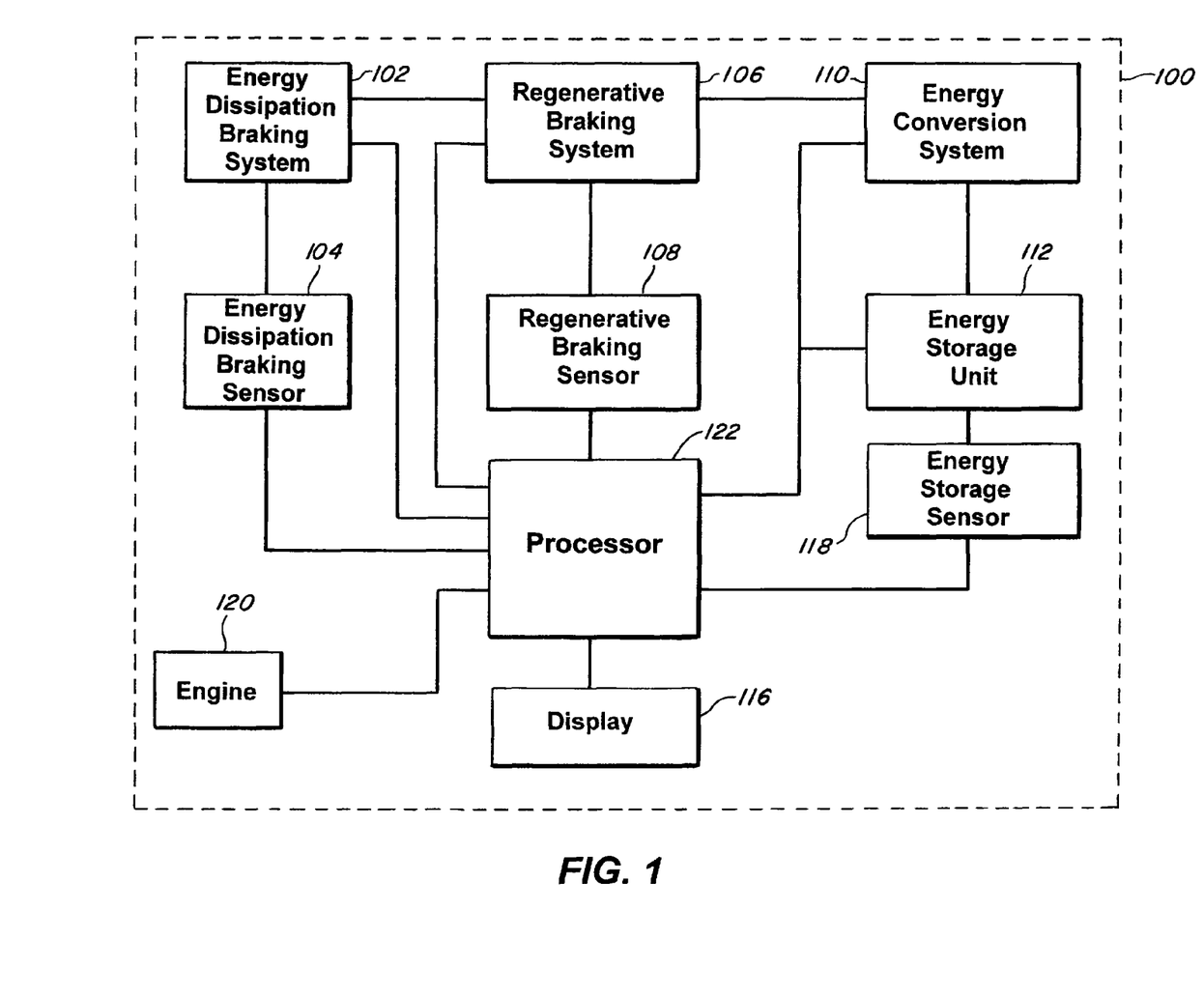
FIG. 1 is a block diagram of a system for displaying braking information according to an embodiment of the present invention.

As seen in FIG. 1, the present invention includes a system for displaying braking information. In FIG. 1, the system is an automobile 100, but the system can be, for example, a transportation device, an automated device or any other type of device which moves and utilizes braking. The automobile 100 includes, for example, an energy dissipation braking system 102, a regenerative braking system sensor 104, a regenerative braking system 106, a regenerative braking system sensor 108, an energy conversion system 110, an energy storage unit 112, a display 116, an energy storage sensor 118, and/or an engine 120.

The energy dissipation braking system 102 is connected to the energy dissipation braking sensor 104, the regenerative braking system 106, and/or the processor 122. The energy dissipation braking system 102 can include one or more energy dissipation brakes. The energy dissipation brakes can be, for example, a hydraulic brake, a caliper brake, a frictional brake, an engine brake, or any other type of brake which dissipates energy. For example, if the automobile 100 had four wheels, the energy dissipation braking system 102 can include four hydraulic brakes. Each of the energy dissipation brakes within the energy dissipation braking system 102 can be activated individually or simultaneously with one or more of the energy dissipation brakes in the energy dissipation braking system 102. The energy dissipation braking system 102 can be activated when there is an indication that the automobile 100 should be slowed down. Such an indication can be through the processor 122 and/or other devices to indicate that the automobile 100 should be slowed down. The energy dissipation braking system 102 can also be used by itself or in conjunction with the regenerative braking system 106 to slow the automobile 100.

The energy dissipation braking sensor 104 is connected to the energy dissipation braking system 102, and/or the processor 122. The energy dissipation braking sensor 104 can generate energy dissipation brake data regarding the operation of the energy dissipation braking system 102. The energy dissipation brake data can be collectively for the energy dissipation braking system 102 or for each of the energy dissipation brakes within the energy dissipation braking system 102. For example, the energy dissipation braking sensor 104 can detect the temperature, whether each of the energy dissipation brakes is active or inactive, a length of time each energy dissipation brake is active or inactive, a supplied braking force, and/or any other data relevant to the operation of the energy dissipation braking system 102. The energy dissipation braking sensor 104 can also determine the application percentage of the energy dissipation braking system 102.

The regenerative braking system 106 is connected to the energy dissipation braking system 102, the regenerative braking sensor 108, the energy conversion system 110, and the processor 122. The regenerative braking system 106 can include one or more regenerative brakes. For example, if an automobile has 4 wheels, the regenerative braking system 106 can have two regenerative brakes, or four regenerative brakes. The regenerative brakes can be positioned at any suitable location in the automobile 100, for example, in the front wheels of the automobile 100, the back wheels of the automobile 100, or on all wheels of the automobile 100. The regenerative braking system 106 can be used by itself or with the energy dissipation braking system 102 to slow the automobile 100.

Each of the regenerative brakes within the regenerative braking system 106 can be activated individually or simultaneously with one or more of the regenerative brakes in the regenerative braking system 106. The regenerative braking system 106 can be activated when there is an indication that the automobile 100 should be slowed down. Such an indication can be through the processor 122 and/or other devices to indicate that the automobile 100 should be slowed down. The regenerative brakes can be automatically deactivated, for example, when the automobile 100 is traveling below a predetermined speed. In one embodiment, the regenerative brakes are deactivated when the automobile 100 is traveling below 6 miles per hour, even when there is an indication that the automobile 100 should be slowed down. In such a scenario, the braking force can be supplied, for example, only by the energy dissipation braking system 102.

The regenerative brakes can be any type of brakes which regenerates energy while braking. Thus, the regenerative brakes recapture some of the energy lost while braking. To regenerate the energy, the regenerative braking system 106 can cooperate with the energy conversion system 110.

The regenerative braking sensor 108 is connected to the regenerative braking system 106 and/or the processor 122. The regenerative braking sensor 108 can generate regenerative brake data regarding the operation of the regenerative braking system 106. The regenerative braking brake data can be collectively for the regenerative braking system 106 or for each of the energy dissipation brakes within the energy dissipation braking system 102. For example, the regenerative braking sensor 108 can detect the temperature, whether each of the regenerative brakes are active or inactive, a length of time each regenerative brake is active or inactive, a supplied braking force, and/or any other data relevant to the operation of the energy dissipation brakes 102. The regenerative braking sensor 108 can also determine the application percentage of the regenerative braking system 106.

The energy conversion system 100 is connected to the regenerative braking system 106, the energy storage unit 112, and/or the processor 122. The energy conversion system 100 generates energy when the regenerative braking system 100 is activated. For example, when the regenerative braking system 106 is activated to slow the automobile 100, the energy conversion system 100 generates energy. In one embodiment, the energy conversion system 100 is a motor, such as an electric motor in a hybrid vehicle. The motor can operate in a first direction when moving the automobile 100. The motor can operate in a second direction when generating energy using the regenerative braking system 106.

The energy storage unit 112 is connected to the energy conversion system 110, the energy storage sensor 118, and/or the processor 122. The energy storage unit 112 receives and stores the energy generated by the energy conversion system 110. The energy storage unit 112 can also provide energy to the energy conversion system 110. For example, if the energy conversion system 110 is a motor, then the energy storage unit 112 can power the motor. The energy conversion system 110 can also provide power to any other electronic device in the automobile 100. The energy conversion system 110 can also aid in starting the engine 120.

The energy storage sensor 118 is connected to the energy storage unit 112 and/or the processor 122. The energy storage sensor 118 detects energy storage data. The energy storage data indicates relevant information about the energy storage unit 112 such as an amount of energy that is stored in the energy storage unit 112, the capacity of the energy storage unit 112, a percent utilization of the energy storage unit 112, an energy recharge rate of the energy storage unit 112, and/or an energy depletion rate of the energy storage unit 112.

The display 116 is connected to the processor 122 and can display various type of information as directed by the processor 122. The engine 120 is connected to the processor 122 and is used by itself or in conjunction with the energy conversion system 110 to move the automobile 100. The engine 120 can be an internal combustion engine, a hybrid engine, a natural fuel engine, an ethanol engine, or any other type of engine that can move the automobile 100.

The processor 122 is connected to the energy dissipation braking system 102, the energy dissipation braking sensor 104, the regenerative braking system 106, the regenerative braking sensor 108, the energy conversion system 110, the energy storage unit 112, the display 116, the energy storage sensor 118, and/or the engine 120. The processor 122 can activate and/or deactivate the energy dissipation braking system 102 and/or the regenerative braking system 106. The processor 122 can also receive the energy dissipation brake data and/or the regenerative brake data. The processor 122 can display various types of information on the display 116 related to the operation of the automobile 100. In one embodiment, based on the energy dissipation brake data and/or the regenerative brake data, the processor 122 can instruct the display 116 to display various types of information related to the energy dissipation brake data and/or the regenerative brake data.

The display 116 can display, for example, information beneficial to a user in promoting or maintaining an easy approach to braking as opposed to an aggressive approach to braking. During an easy approach to braking, the user applies pressure to the brake pedal at an earlier time than the aggressive approach to braking. This allows more time for the automobile 100 to be slowed down and can increase a usage of the regenerative braking system 106 and reduce a usage of the energy dissipation braking system 102. This allows the energy conversion system 110 to generate more energy for storage within the energy storage unit 112. Since the energy dissipation braking system 102 does not generate energy which is stored within the energy storage unit 112, the reduction of reliance on the energy dissipation braking system 102 in stopping the automobile 100 can reduce an amount of energy that is wasted and/or not recycled.

Figure 2:
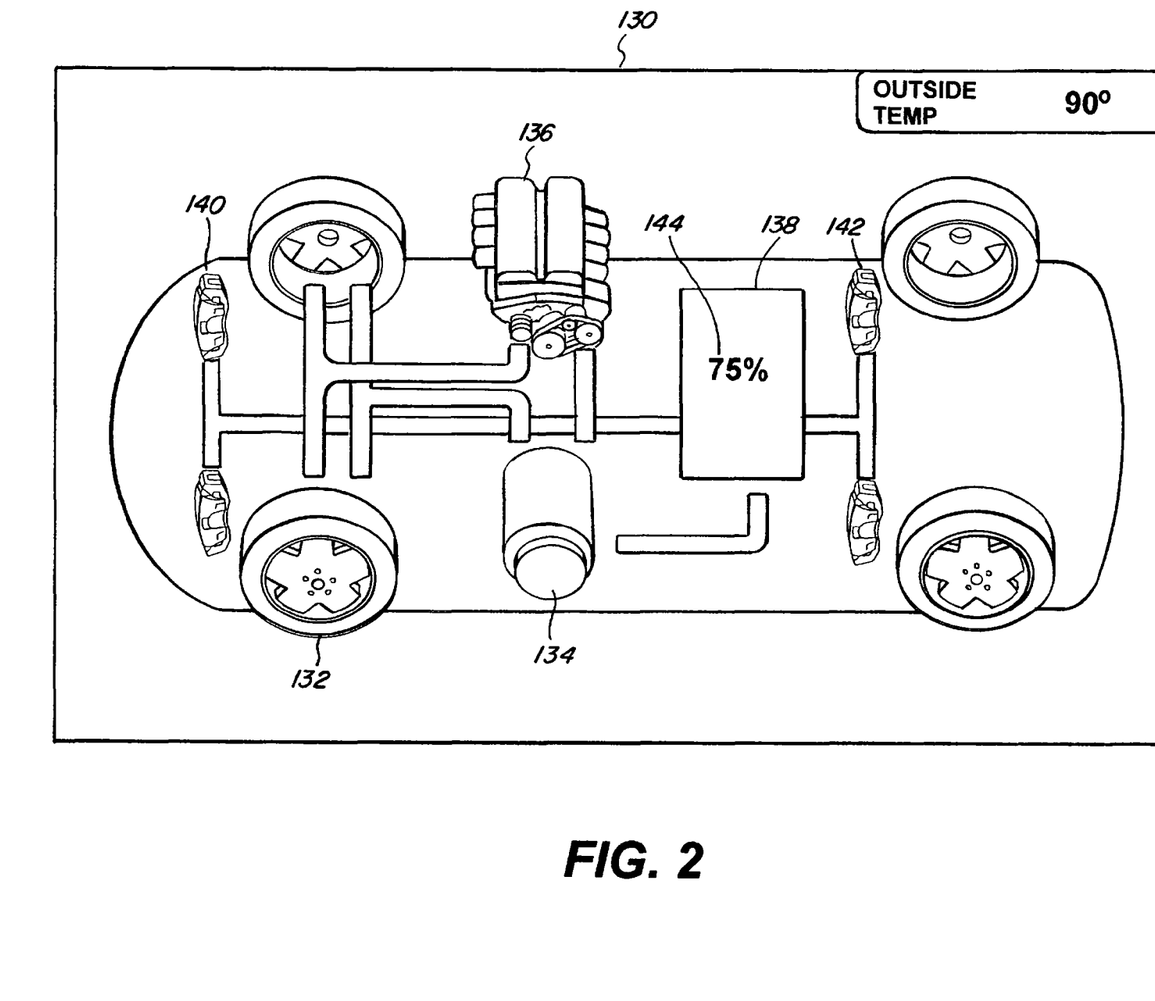
FIG. 2 is a display of vehicle information according to an embodiment of the present invention.

For example, as seen in FIG. 2, the display 116 can display the vehicle information 130. The vehicle information 130 includes wheel icon 132, motor icon 134, engine icon 136, battery information icon 138, brake icon 140, and/or brake icon 142. The wheel icon 132 can change from a first display mode when the automobile is stationary to a second display mode when the automobile is moving. The first display mode can be, for example, a first color, while a second display mode can be, for example, a second color. In one embodiment, the first color is different from the second color.

The motor icon 134 can correspond, for example, to the operation of the energy conversion system 110 when the energy conversion system 110 is a motor. When the energy conversion system 110 is used to move the automobile 100, the motor icon 134 can be in a first display mode, and when the energy conversion system 110 is being used to recharge the energy storage unit 112, the motor icon 134 can be in a second display mode. For example, when the regenerative braking system 106 is inactive and the energy conversion system 110 is used to move the automobile 100, the motor icon 134 can be in the first display mode. However, when the regenerative braking system 106 is active and the energy conversion system 110 is used to recharge the energy storage unit 112, the motor icon 134 can be in the second display mode. By viewing when the energy conversion system 110 is recharging the energy storage unit 112, the user may be influenced into applying the regenerative braking system 106 at an earlier time period to reduce the reliance on the energy dissipation braking system 102.

The engine icon 136 can correspond, for example, to the operation of the engine 120 in the automobile 100. When the engine 120 is idling, the engine icon 136 can be in a first display mode. When the engine 120 is not idling, the engine icon 136 can be in a second display mode. For example, when the engine 120 is being revved, the engine icon 136 can be in the second display mode.

The battery icon 138 can correspond, for example, to the operation of the energy storage unit 112. The battery icon 138 can be in a first display mode when the energy storage unit 112 is being depleted. The battery icon 138 can be in a second display mode when the energy storage unit 112 is being charged. The battery icon 138 can also be in a third display mode when the energy storage unit 112 is below a predetermined energy threshold. The third display mode can be, for example, a third color. In the third display mode, the battery icon 138 can also flash or perform other indicia. The battery icon 138 can also display an indicia 144. The indicia 144 can be a number indicating a percent charge of the energy storage unit 112. The indicia 144 can also be a number indicating an application percentage of the regenerative braking system 106.

The brake icons 140 and 142 can correspond, for example, to the operation of the regenerative braking system 106. The brake icon 140 includes the two brake icons in a front section of the automobile depicted in the vehicle information 130. The brake icon 142 includes the two brake icons in a back section of the automobile depicted in the vehicle information 130.

In another embodiment, the brake icons 140 and 142 correspond to the operation of the regenerative braking system 106 and/or the energy dissipation braking system 102. For example, when the regenerative braking system 106 is inactive, the regenerative braking system 106 is not cooperating with the energy conversion system 110 to generate power for the energy storage unit 112, and/or the energy dissipation braking system 102 is active, the brake icons 140 and 142 can be in a first display mode.

The brake icons 140 and 142 can also be in a first display mode when an energy efficiency rate is below a predetermined energy efficiency threshold, an application percentage of the energy dissipation braking system 102 is above a first predetermined percentage, and/or an application percentage of the regenerative braking system 106 is below a second predetermined percentage. The energy efficiency rate, the application percentage of the energy dissipation braking system 102, and/or the application percentage of the regenerative braking system 106 can be calculated, for example, by the processor 122.

The visual displays of the brake icons 140 and 142 can also promote the reduced usage of the energy dissipation braking system 102 and increase the usage of the regenerative braking system 106. This can improve the efficiency of the automobile 100.

The processor 122 can use the energy data from the energy storage sensor 118 to calculate the energy efficiency rate. The energy efficiency rate can be calculated, for example, by determining the ideal energy regeneration of the regenerative braking system 106 and the energy conversion system 110 during braking of the automobile 100, and determining the actual energy regeneration of the regenerative braking system 106 and the energy conversion system 110 during braking of the automobile 100. In one embodiment, the energy efficiency rate is calculated by dividing the actual energy regeneration by the ideal energy regeneration. In another embodiment, the energy efficiency rate is calculated by determining the variances from the ideal energy regeneration by the actual energy regeneration.

The brake icons 140 and 142 can be in a second display mode when the regenerative braking system 106 is active, the regenerative braking system 106 is cooperating with the energy conversion system 110 to generate power for the energy storage unit 112, and/or the energy dissipation braking system 102 is inactive. The brake icons 140 and 142 can also be in a second display mode when the energy efficiency rate is above a predetermined energy efficiency threshold, the application percentage of the energy dissipation braking system 102 is below the first predetermined percentage, and/or the application percentage of the regenerative braking system 106 is above a second predetermined percentage.

In one embodiment, the brake icon 140 corresponds only to the operation of the two individual regenerative brakes in the front of the automobile 100, and/or the two individual energy dissipation brakes in the front of the automobile 100. In another embodiment, the brake icon 142 corresponds only to the operation of the two individual regenerative brakes in the rear of the automobile 100, and/or the two individual energy dissipation brakes in the rear of the automobile 100.

Figure 3:
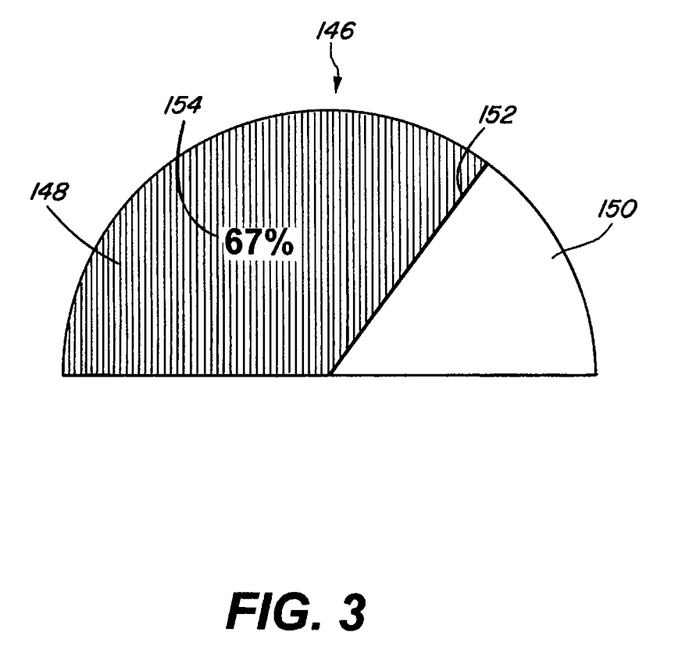
FIG. 3 is a display of braking information according to an embodiment of the present invention.

In another embodiment, the processor 122 can provide commands or instructions to the display 116 to display braking information 146 as shown in FIG. 3. The braking information 146 includes a section 148 and a section 150 divided by a line 152. The braking information also includes indicia 154. In one embodiment, the section 148 corresponds to the actual energy regeneration of the regenerative braking system 106 and the energy conversion system 110 during braking of the automobile 100, while the section 150 corresponds to the difference between the ideal energy regeneration and the actually energy regeneration. The indicia 154 can correspond to the energy efficiency rate. The section 148 can be displayed in a first display mode when the energy efficiency rate is below a predetermined energy efficiency threshold, and the section 148 can be displayed in a second display mode when the energy efficiency rate is above a predetermined energy efficiency threshold.

In another embodiment, the section 148 corresponds to the application percentage of the regenerative braking system 106. The section 150 can correspond to the application percentage of the energy dissipation braking system 102. The indicia 154 can be a numerical representation of the application percentage of the regenerative braking system 106. When the application percentage of the energy dissipation braking system 102 is above the first predetermined percentage and/or the application percentage of the regenerative braking system 106 is below the second predetermined percentage, the section 148 can be in the first display mode. The section 150 or any other portion of the braking information 146 can also be in the first display mode. When the application percentage of the energy dissipation braking system 102 is below the first predetermined percentage and/or the application percentage of the regenerative braking system 106 is above the second predetermined percentage, the section 148 can be in the second display mode. The section 150 or any other portion of the braking information 146 can also be in the second display mode.

The braking information 146 can consciously or subconsciously cause the user to strive for a more energy efficient usage of the automobile 100 while braking the automobile 100. For example, the user can brake in a pattern where the energy conversion system 110 can maximize its energy contribution to the energy storage unit 112. This can involve, for example, braking at an earlier time period to reduce the usage of the energy dissipation braking system 102 and increase a usage of the regenerative braking system 106.

Figure 4:
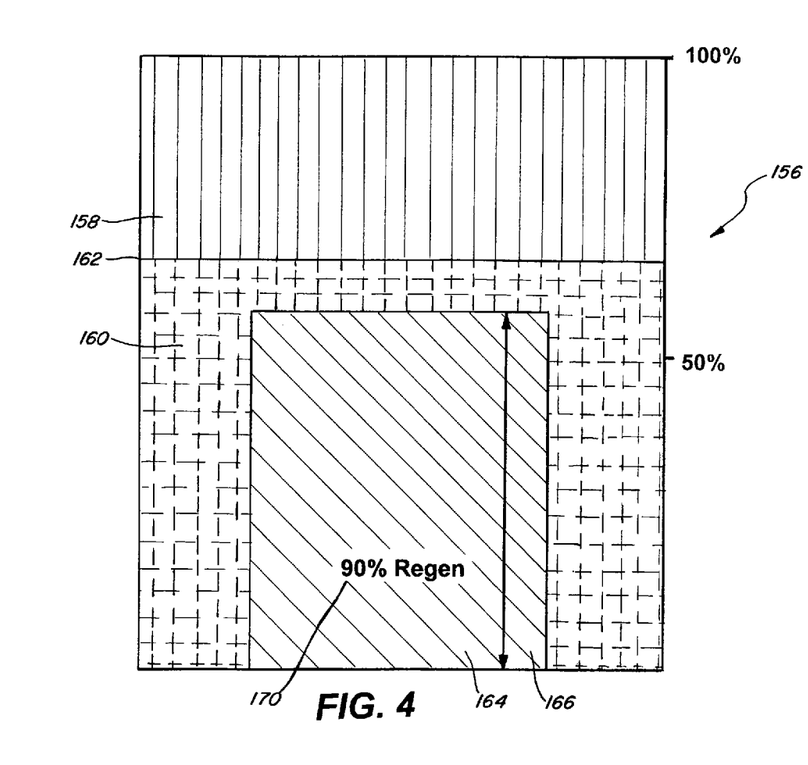
FIG. 4 is a display of braking information according to an embodiment of the present invention.
Figure 5:
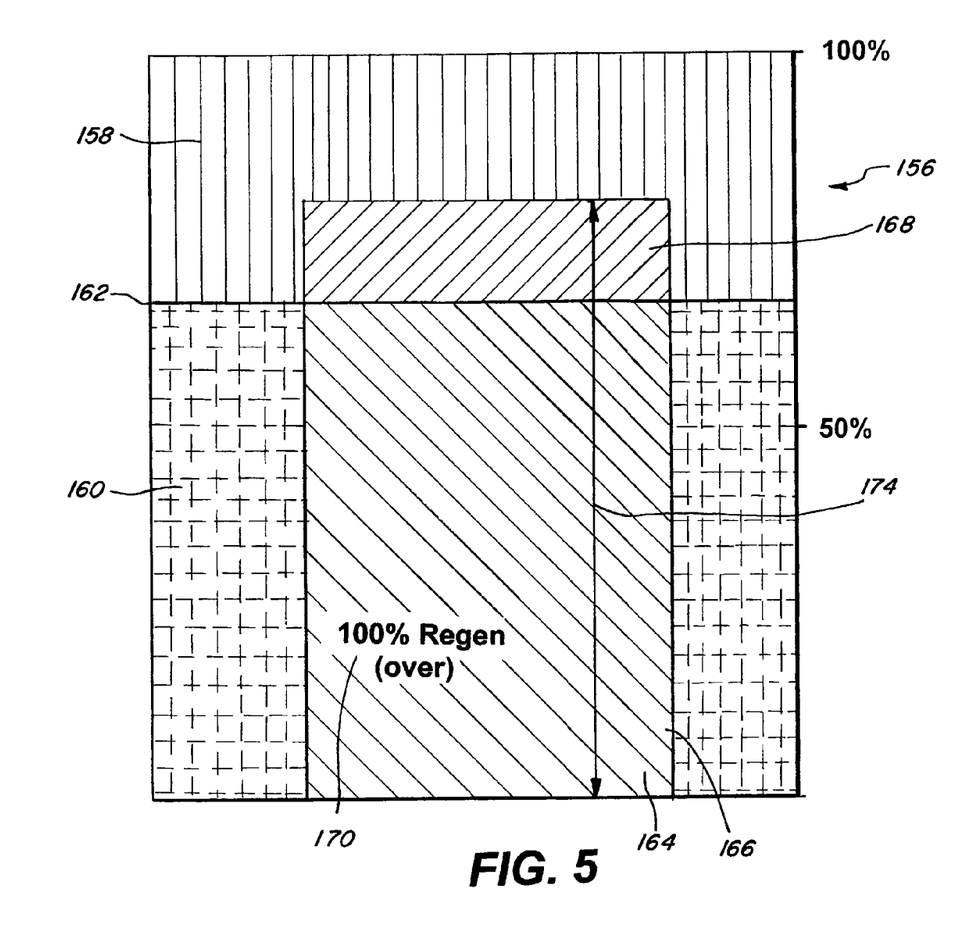
FIG. 5 is a display of braking information according to an embodiment of the present invention.
Figure 6:
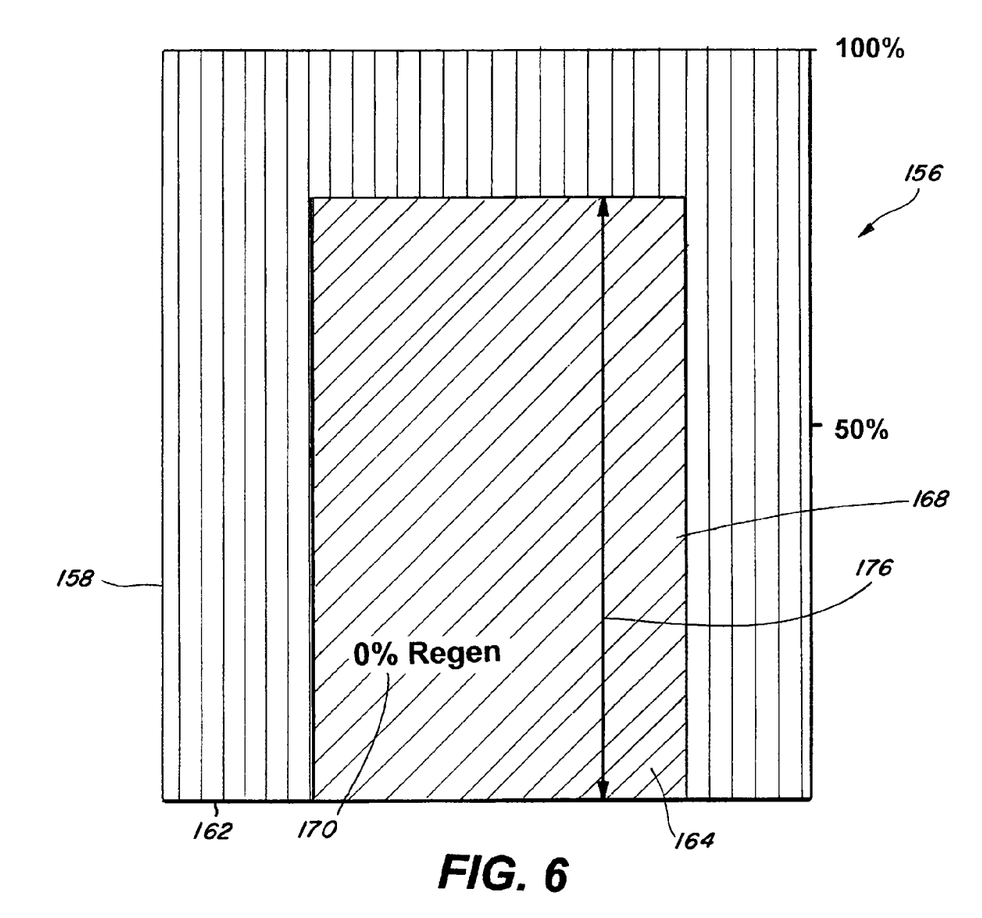
FIG. 6 is a display of braking information according to an embodiment of the present invention.

In another embodiment, the processor 122 can instruct the display 116 to display the braking information 156 as shown in FIG. 4, FIG. 5, and FIG. 6. The braking information includes a section 158, a section 160, and a section 164. The section 158 and the section 160 are divided by a line 162. The section 158 corresponds to a maximum application percentage available for braking using the energy dissipation braking system 102 while the section 160 corresponds to a maximum application percentage available for braking using the regenerative braking system 106. Depending on the driving conditions, the line 162 may move up or down depending on the maximum application percentage available for braking using the energy dissipation braking system 102 and the maximum application percentage available for braking using the regenerative braking system 106 for the specific driving condition. The section 164 includes the section 166 and indicia 170. The section 164 indicates the combined braking application of the energy dissipation braking system 102 and the regenerative braking system 106. The indicia 170 can indicate the energy efficiency rate or any other information related to the operation of the regenerative braking system 106.

In FIG. 4, the section 164 is below the line 162, meaning that the automobile 100 is braking only through the regenerative braking system 106 and not through the energy dissipation braking system 102. Thus, the section 164 includes only a single section 166. The distance between the section 164 and the line 162 indicates an amount of braking available while still using only the regenerative braking system 106 and not the energy dissipation braking system 102. Thus, the user can still further depress on a brake pedal in the automobile 100 to provide more braking force to the automobile 100 and still use only the regenerative braking system 106. In FIG. 4, the section 158 is in a first color, the section 160 is in a second color, and the section 166 is in a third color.

In FIG. 5, the user has now depressed further on the brake pedal in the automobile 100. Now, the section 164 spans the line 174 and is above the line 162. This indicates that the braking force supplied to the automobile 100 is through both the regenerative braking system 106 and the energy dissipation braking system 102. The section 164 above the line 162 is the section 168, while the section 164 below the line 162 is the section 166. The section 164 above the line 162 can be in a fourth color.

Furthermore, the indicia 170 is at 100% with the term "over" indicating that the energy efficiency rate is at 100%, but that the energy dissipation braking system 102 is being used in addition to the regenerative braking system 106. In another embodiment, the indicia 170 can be at 75% indicating that the system is not completely efficient since the energy dissipation braking system 102 is being used in addition to the regenerative braking system 106, instead of only the regenerative braking system 106.

In FIG. 6, the automobile 100 is traveling below the predetermined speed, such as below 6 miles per hour. Thus, the only braking available is the energy dissipation braking system 102. The regenerative braking system 106 is inactive and not used since the automobile 100 is traveling below the predetermined speed. Since only the energy dissipation braking system 102 is used, there is no energy generation from the regenerative braking system 106. Thus, the indicia 170 is at 0%. Furthermore, the line 162 drops down to the bottom of the braking information 156. Thus, the section 160, and the section 166 in the section 164, for example, disappears since the regenerative braking system 106 is not being used.

FIGS. 7, 8, 9, 10, and 11 shows the automobile 100 in operation using an easy approach and an aggressive approach to braking. The brake pedal 100 is depressed further in the aggressive approach to braking when compared with the easy approach to braking. The easy approach to braking uses more of the regenerative braking system 106 than the aggressive approach to braking. Thus, similar to FIG. 6, the braking information 156 can consciously or subconsciously cause the user to strive for a more energy efficient usage of the automobile 100 while braking the automobile 100.

Figure 7:
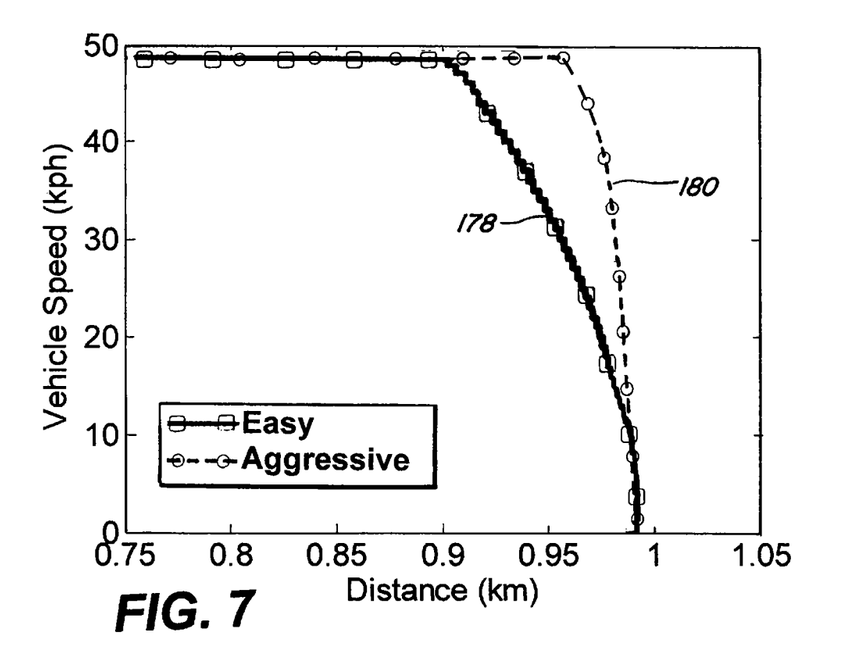
FIG. 7 is a graph depicting vehicle speed versus distance according to an embodiment of the present invention.

FIG. 7 depicts the speed of the automobile 100 over distance for both the easy approach and the aggressive approach to braking. As seen in FIG. 7 the brake pedal is depressed at approximately 0.9 km during the easy approach and at approximately 0.97 km during the aggressive approach. In both the easy approach and the aggressive approach, the automobile 100 comes to a complete stop or nearly a complete stop at 0.99 km or a distance slightly less than 1 km. However, the automobile 100 decelerates at a much more rapid pace in the aggressive approach.

Figure 8:
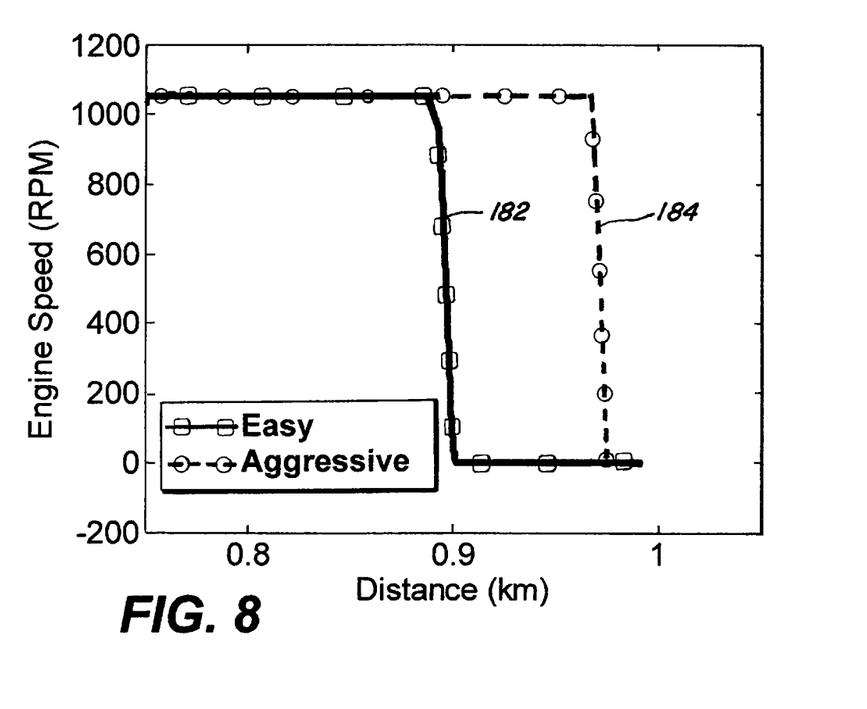
FIG. 8 is a graph depicting engine speed versus distance according to an embodiment of the present invention.

FIG. 8 depicts the engine speed of the automobile 100 over distance for both the easy approach and the aggressive approach to braking. In FIG. 8, the curve 182 represents the engine speed for the engine 100 using the easy approach to braking while the curve 184 represents the engine speed for the engine 100 using the aggressive approach to braking. In the easy approach, the engine speed for the engine 120 drops from over 1000 rotations-per-minute ("RPM") to 0 RPM at approximately 0.9 km, when the brake pedal is depressed. This is because during the easy approach, the regenerative braking system 106 is activated and the engine 120 is not moving the automobile 100 any more. In the aggressive approach, the engine speed drops from over 1000 RPM to 0 RPM at approximately 0.97 km. This is because in the aggressive approach, the brake pedal is not depressed until 0.97 km.

Figure 9:
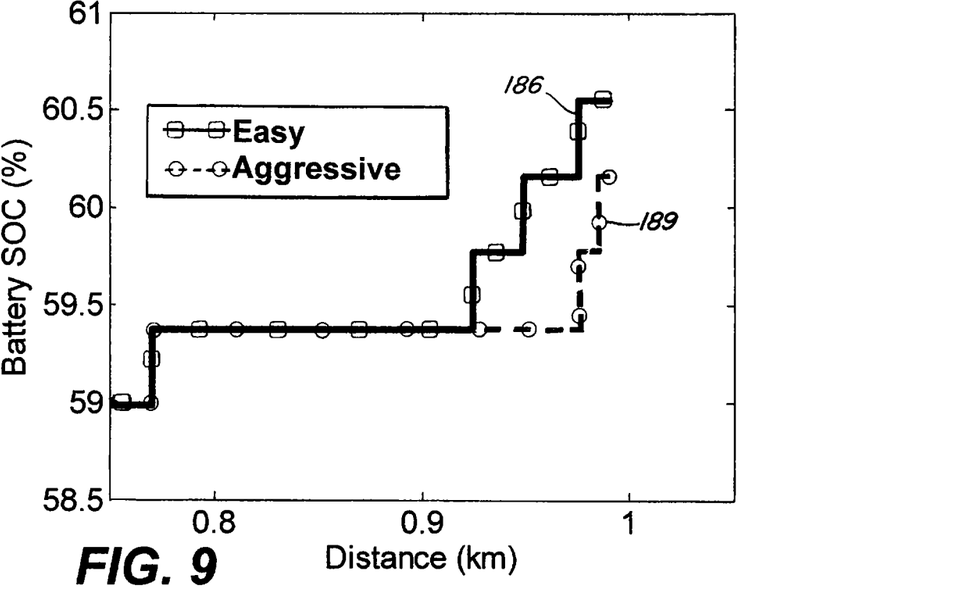
FIG. 9 is a graph depicting battery strength of charge over distance according to an embodiment of the present invention.

FIG. 9 depicts a strength of charge for the energy storage unit 112 in the automobile 100. The strength of charge for the energy storage unit 112 using the each approach to braking corresponds to a curve 186, while the strength of charge for the energy storage unit 112 using the aggressive approach to braking corresponds to a curve 188. As can be seen in FIG. 9, the curve 186 rises earlier than the curve 188. At the approximate stopping distance near the 0.99 km distance, the curve 186 has a larger value than the curve 188. This indicates that the strength of charge using the easy approach to braking will generate more energy for the energy storage unit 112 than the aggressive approach to braking. A greater strength of charge indicates that more energy is being captured and recycled, which improves an overall efficiency of the automobile 100. Thus, the promotion of the easy approach to braking using the processor 122 and/or the display 116 can reduce an amount of money spent on charging the energy storage unit 112, and/or providing fuel for the engine 120. Furthermore, the automobile 100 may produce fewer emissions and/or be more environmentally friendly.

Figure 10:
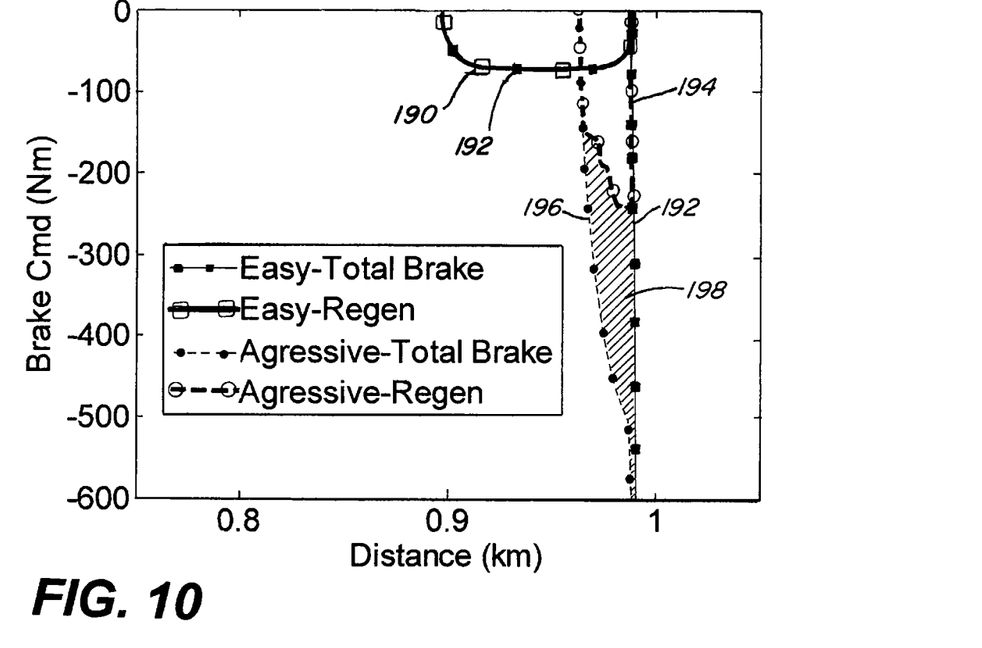
FIG. 10 is a graph depicting brake command over distance according to an embodiment of the present invention.

FIG. 10 depicts brake command over distance. Curve 190 corresponds to a braking force supplied by the regenerative braking system 106 using the easy approach to braking while curve 192 corresponds to a total braking force supplied using the easy approach to braking. The curves 190 and 192 begin at approximately 0.90 km when the braking of the automobile 100 begins using the easy approach to braking. The curve 192 overlaps with the curve 190 until very close to the 0.99 km distance where the automobile 100 stops. This is because for most of the braking of the automobile 100, only the regenerative braking system 106 is used. The energy dissipation braking system 102 is only activated when the automobile 100 is traveling at close to or below the predetermined speed.

Curve 194 corresponds to a braking force supplied by regenerative braking system 106 using the aggressive approach to braking while curve 196 correspond to a total braking force supplied using the aggressive approach to braking. The curves 194 and 196 begin at approximately 0.97 km when the braking of the automobile 100 begins using the aggressive approach to braking and ends at approximately 0.99 km when the automobile 100 comes to a stop. As can be seen in FIG. 10, the curve 196 includes more Newton meters than the curve 194. This is because in the aggressive approach to braking, the energy dissipation braking system 102 is used in addition to the regenerative braking system 106 in order to stop the automobile 100 by the 0.99 km distance. An area 198 indicating a difference between the curve 196 and the curve 194 corresponds to energy wasted due to the use of the energy dissipation braking system 102. Since the energy dissipation braking system 102 does not recharge the energy storage unit 112, any application of the energy dissipation braking system 102 is wasted energy. In contrast, the easy approach to braking wastes less energy since the energy dissipation braking system 102 is sparsely used. Thus, by promoting the easy approach to braking using the processor 122 and the display 116, more energy is captured and recycled instead of being wasted.

Figure 11:
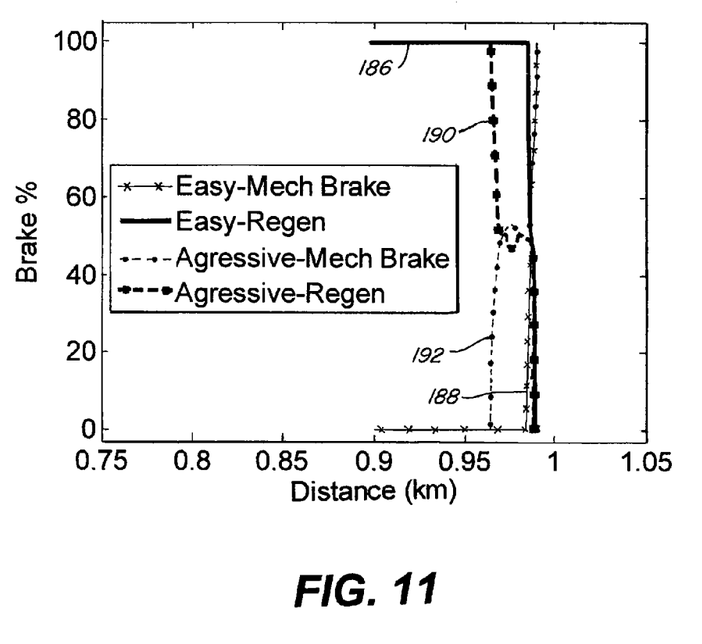
FIG. 11 is a graph of brake percentage over distance according to an embodiment of the present invention.

FIG. 11 depicts a braking percentage of the energy dissipation braking system 102 and the regenerative braking system 106 using the easy approach and the aggressive approach to braking. The curve 186 depicts the application percentage of the regenerative braking system 106 during the easy approach to braking while the curve 188 depicts the application percentage of the energy dissipation braking system 102 using the easy approach to braking. As can be seen in FIG. 11, the regenerative braking system 106 is applied at 0.9 km in the easy approach to braking. However, the energy dissipation braking system 102 is not applied until close to the stopping distance of 0.99 km.

The curve 190 depicts the application percentage of the regenerative braking system 106 during the aggressive approach to braking while the curve 192 depicts the application percentage of the energy dissipation braking system 102 during the aggressive approach to braking. The regenerative braking system 106 and the energy dissipation braking system 106 are both applied at approximately 0.97 km when the aggressive approach to braking begins. The application percentage of the regenerative braking system 102 decreases to approximately 0% near the 0.99 km stopping distance when the automobile 100 is traveling at or below the predetermined speed. Conversely, the application percentage of the energy dissipation braking system 106 increases drastically to nearly 100% near the 0.99 km stopping distance since the use of the regenerative braking system 102 is discontinued.

Figure 12:
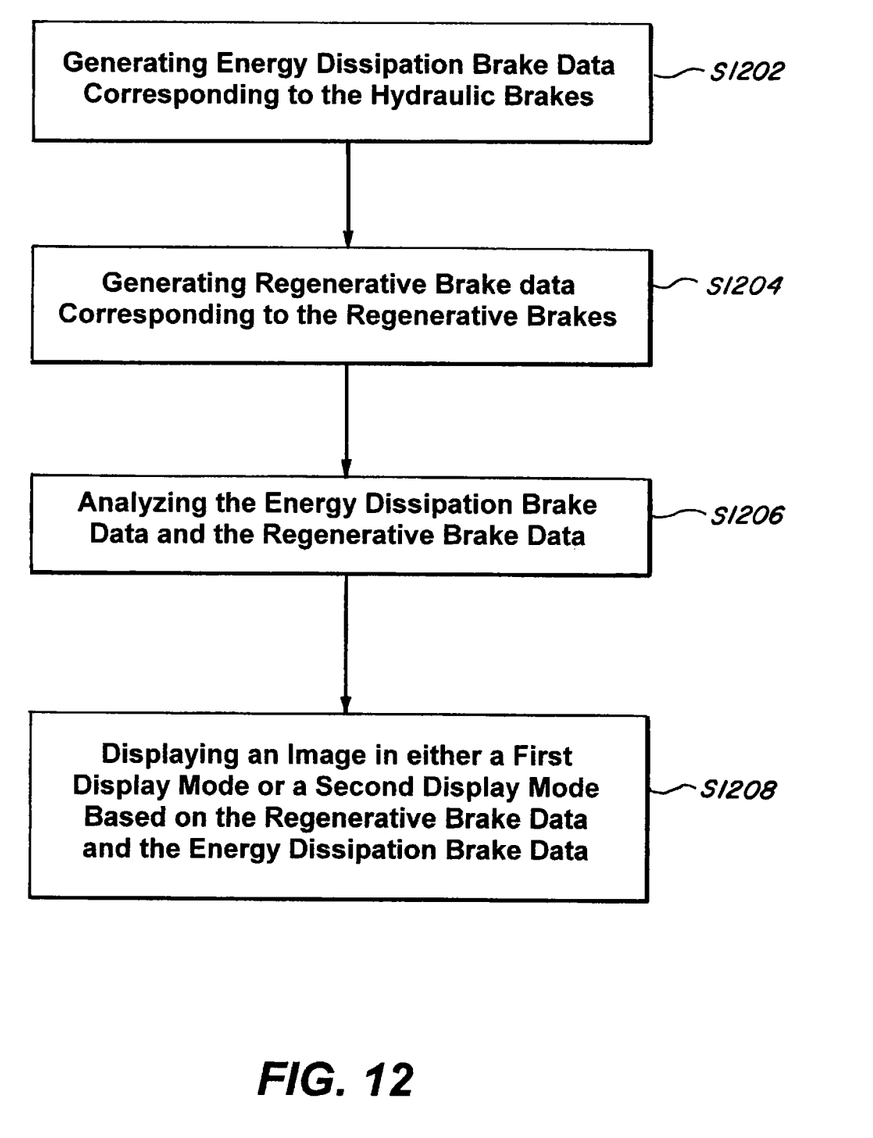
FIG. 12 is a flow chart of a process according to an embodiment of the present invention.

In one embodiment, the present invention can also be a process as depicted in FIG. 12. In Step S1202 energy dissipation brake data corresponding to the energy dissipation brakes are generated. For example, the energy dissipation braking sensor 104 can generate energy dissipation brake data from the energy dissipation braking system 102. In Step S1204, regenerative brake data corresponding to the regenerative brakes are generated. For example, the regenerative braking sensor 108 can generate regenerative brake data from the regenerative braking system 106. In Step S1206, the hydraulic brake data and the regenerative brake data are analyzed. For example, the processor 122, the energy dissipation braking sensor 104, and/or the regenerative braking sensor 108 can analyze the hydraulic brake data and the regenerative brake data. In Step S1208 an image is displayed in either a first display mode or a second display mode based on the regenerative brake data and the hydraulic brake data. For example, the display 116 can display the braking information 130, 146, and/or 156.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. Furthermore the method and/or algorithm need not be performed in the exact order described, but instead may be varied. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A system for displaying braking information comprising:
   a friction braking sensor configured to generate friction brake data; a regenerative braking sensor configured to generate regenerative brake data; a processor configured to:
      receive the friction brake data and the regenerative brake data,
      analyze the friction brake data and the regenerative brake data, and
      determine a value or a percentage of application of friction braking based on the analyzed friction brake data; and
   a display communicatively coupled to the processor, the display configured to display an image showing a first indicator for the analyzed regenerative brake data and a second indicator for the value or the percentage of the application of friction braking.

2. The system of claim 1 wherein the processor determines an energy efficiency rate based on the analyzed friction brake data and the analyzed regenerative brake data, and the image further shows the determined energy efficiency rate.

3. The system of claim 2 further comprising an energy storing sensor communicatively coupled to the processor and configured to generate energy storage data from an energy storage unit, wherein the processor determines the energy efficiency rate based on the energy storage data.

4. The system of claim 1 wherein the processor determines a value or a percentage of application of regenerative braking based on the analyzed regenerative brake data, and the first indicator of the image corresponds to the value or the percentage of the application of regenerative braking.

5. The system of claim 1 wherein the image is displayed in a first display mode when the analyzed regenerative brake data indicate that a regenerative brake is active and the image is displayed in a second display mode when the analyzed friction brake data indicate that a friction brake is active.

6. The system of claim 1 wherein the regenerative braking sensor generates the regenerative brake data from an electric motor.

7. An automobile comprising:
   a hydraulic brake;
   a hydraulic braking sensor configured to generate hydraulic brake data from the hydraulic brake;
   a regenerative brake;
   a regenerative braking sensor configured to generate regenerative brake data from the regenerative brake;
   a processor configured to:
      receive and analyze the regenerative brake data and the hydraulic brake data,
      determine a value or a percentage of application of the hydraulic brake based on the analyzed hydraulic brake data, and
      determine a value or a percentage of application of the regenerative brake based on the analyzed regenerative brake data; and
   a display communicatively coupled to the processor, the display configured to display an image showing a first indicator for the analyzed regenerative brake data and a second indicator for the value or the percentage of the application of the hydraulic brake.

8. The automobile of claim 7 wherein the image is displayed in a first display mode when the value or the percentage of the application of the hydraulic brake is less than or equal to a predetermined value or percentage and in a second display mode when the value or the percentage of the application of the hydraulic brake exceeds the predetermined value or percentage.

9. The automobile of claim 7 further comprising an energy storing sensor communicatively coupled to the processor and configured to generate energy storage data from an energy storage unit,
wherein the processor determines an energy efficiency rate based on the value or the percentage of the application of the hydraulic brake and the value or the percentage of the application of the regenerative brake, and the image further shows the energy efficiency rate.

10. The automobile of claim 7 wherein the hydraulic brake is a friction brake, the regenerative braking sensor generates the regenerative brake data from an electric motor, and the processor is a powertrain control unit.

11. A method for displaying braking information for hydraulic brakes and regenerative brakes of a transportation device which utilizes braking comprising:
generating, using a hydraulic braking sensor, hydraulic brake data corresponding to the hydraulic brakes;
generating, using a regenerative braking sensor, regenerative brake data corresponding to the regenerative brakes;
analyzing, using a processor, the hydraulic brake data and the regenerative brake data;
determining, using the processor, a value or a percentage of application of the hydraulic brakes based on the analyzed hydraulic brake data; and
displaying, using a display, an image showing a first indicator for the analyzed regenerative brake data and a second indicator for the value or the percentage of the application of the hydraulic brakes.

12. The method of claim 11 wherein the image includes a first portion showing the first indicator and a second portion showing the second indicator.

13. The method of claim 11 further comprising:
generating, using an energy storage sensor, energy storage data corresponding to an energy storage unit;
determining, using the processor, an energy efficiency rate based on the generated energy storage data, the analyzed hydraulic brake data, and the analyzed regenerative brake data; and
displaying, using the display, the determined energy efficiency rate.

14. The method of claim 11 wherein the step of displaying the image includes displaying, using the display, the image in a first display mode when the analyzed regenerative brake data indicate that the regenerative brakes are active and displaying, using the display, the image in a second display mode when the analyzed hydraulic brake data indicate that the hydraulic brakes are active.

15. The method of claim 11 further comprising:
determining, using the processor, a value or a percentage of application of the regenerative brakes based on the analyzed regenerative brake data, wherein the first indicator of the image corresponds to the value or the percentage of the application of the regenerative brakes.

16. The method of claim 15 further comprising displaying, using the display, the image in a first display mode when the value or the percentage of the application of the hydraulic brakes is less than or equal to a predetermined value or percentage and in a second display mode when the value or the percentage of the application of the hydraulic brakes exceeds the predetermined value or percentage.

* * * * *